(12) United States Patent
Ginsburg et al.

(10) Patent No.: US 11,323,957 B2
(45) Date of Patent: May 3, 2022

(54) APPARATUS, SYSTEM, AND METHOD OF CHANNEL SWITCHING

(71) Applicant: INTEL CORPORATION, Santa Clara, CA (US)

(72) Inventors: Noam Ginsburg, Portland, OR (US); Oz Shalev, Hogla (IL)

(73) Assignee: INTEL CORPORATION, Santa Clara, CA (US)

( * ) Notice: Subject to any disclaimer, the term of this patent is extended or adjusted under 35 U.S.C. 154(b) by 678 days.

(21) Appl. No.: 15/474,163

(22) Filed: Mar. 30, 2017

(65) Prior Publication Data

US 2018/0288698 A1  Oct. 4, 2018

(51) Int. Cl.
*H04W 52/02* (2009.01)
*H04W 72/04* (2009.01)
*H04W 88/08* (2009.01)

(52) U.S. Cl.
CPC ... *H04W 52/0206* (2013.01); *H04W 52/0216* (2013.01); *H04W 52/0229* (2013.01); *H04W 52/0274* (2013.01); *H04W 72/0446* (2013.01); *H04W 88/08* (2013.01); *Y02D 30/70* (2020.08)

(58) Field of Classification Search
CPC ......... H04W 52/0206; H04W 52/0216; H04W 52/0229; H04W 52/0274; H04W 72/0446; H04W 88/08; Y02D 30/70; Y02D 70/00; Y02D 70/1224; Y02D 70/1262; Y02D 70/1264; Y02D 70/142; Y02D 70/144; Y02D 70/146; Y02D 70/162; Y02D 70/164; Y02D 70/166; Y02D 70/168; Y02D 70/20; Y02D 70/22; Y02D 70/26
See application file for complete search history.

(56) References Cited

U.S. PATENT DOCUMENTS 9,820,117 B1 * 11/2017 Tran ................... H04W 4/21
2006/0109846 A1 * 5/2006 Lioy .................. H04W 76/27
370/389

(Continued)

OTHER PUBLICATIONS

IEEE Std 802.11 ™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

(Continued)

*Primary Examiner* — Omer S Mian
*Assistant Examiner* — Bao G Nguyen
(74) *Attorney, Agent, or Firm* — Shichrur & Co.

(57) ABSTRACT

Some demonstrative embodiments include apparatuses, devices, systems and methods of channel switching. For example, an apparatus may include logic and circuitry configured to cause a wireless communication station to transmit a power save mode indication to an Access Point (AP) over a first wireless communication channel; to wait over the first wireless communication channel for a waiting period subsequent to transmission of the power save mode indication; to switch to a second wireless communication channel after the waiting period; and to adjust a duration of the waiting period based on reception of one or more frames from the AP during the waiting period.

23 Claims, 5 Drawing Sheets

(56) References Cited

U.S. PATENT DOCUMENTS

| | | | |
|---|---|---|---|
| 2006/0215601 A1* | 9/2006 | Vleugels | H04W 74/06 370/328 |
| 2007/0233845 A1* | 10/2007 | Song | H04L 12/2809 709/223 |
| 2008/0089389 A1 | 4/2008 | Hu | |
| 2008/0207215 A1* | 8/2008 | Chu | H04W 40/26 455/452.2 |
| 2009/0089004 A1* | 4/2009 | Vook | G06F 11/263 702/123 |
| 2009/0129273 A1* | 5/2009 | Zou | H04L 45/24 370/235 |
| 2009/0325533 A1* | 12/2009 | Lele | G06F 1/3209 455/343.1 |
| 2011/0103299 A1* | 5/2011 | Shuey | H04L 1/1607 370/328 |
| 2012/0131184 A1* | 5/2012 | Luna | H04W 28/14 709/224 |
| 2012/0314663 A1* | 12/2012 | Dwivedi | H04L 1/1816 370/329 |
| 2013/0003645 A1* | 1/2013 | Shapira | H04B 7/15507 370/315 |
| 2013/0121263 A1* | 5/2013 | Nguyen | H04W 72/0406 370/329 |
| 2013/0201884 A1 | 8/2013 | Freda et al. | |
| 2014/0064168 A1* | 3/2014 | Horiguchi | H04W 52/0229 370/311 |
| 2014/0297878 A1* | 10/2014 | Minami | H04L 65/1066 709/227 |
| 2015/0098374 A1* | 4/2015 | Homchaudhuri | H04W 52/0238 370/311 |
| 2017/0310610 A1* | 10/2017 | Qi | H04L 49/355 |
| 2018/0249397 A1* | 8/2018 | Corradino | H04W 48/02 |
| 2018/0288698 A1* | 10/2018 | Ginsburg | H04W 52/0216 |

OTHER PUBLICATIONS

Wi-Fi Peer-to-Peer (P2P), Technical Specification, Version 1.5, Aug. 4, 2014, 183 pages.

International Search Report and the Written Opinion for International Application No. PCT/US2018/020097 dated Jun. 1, 2018, 12 pages.

International Preliminary Report on Patentability for International Application No. PCT/US2018/020097, dated Oct. 10, 2019, 9 pages.

* cited by examiner

APPARATUS, SYSTEM, AND METHOD OF CHANNEL SWITCHING

TECHNICAL FIELD

Embodiments described herein generally relate to channel switching.

BACKGROUND

A wireless communication device may communicate with an Access Point (AP) over a first wireless communication channel, for example, to communicate data between the device and the AP.

The wireless communication device may switch from the first wireless communication channel to a second wireless communication channel, for example, to communicate with a peer to peer (P2P) device, which operates over the second wireless communication channel, e.g., to communicate data with the P2P device.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
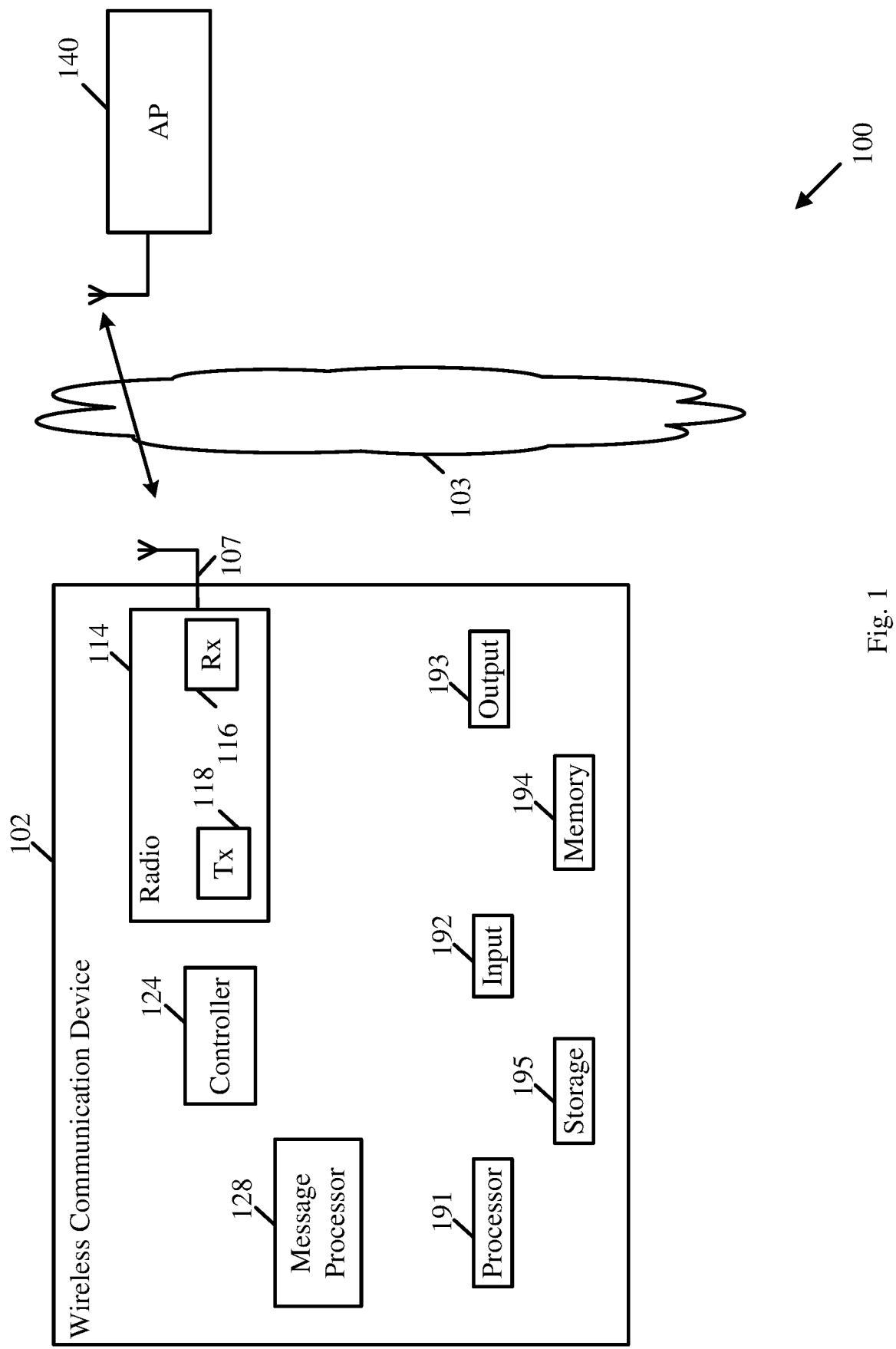
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (IEEE 802.11-2016, *IEEE Standard for Information technology—Telecommunications and information exchange between systems Local and metropolitan area networks—Specific requirements, Part 11: Wireless LAN Medium Access Control (MAC) and Physical Layer (PHY) Specifications*, Dec. 7, 2016)) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification* Version 1.1, April 2011, Final specification) and/or future versions and/or derivatives thereof, devices and/or networks operating in accordance with existing WiFi Alliance (WFA) Peer-to-Peer (P2P) specifications (*WiFi P2P technical specification*, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 or 5 Gigahertz (GHz). However, other embodiments may be implemented utilizing any other suitable wireless communication frequency bands, for example, a 60 GHz band, a millimeterWave (mmWave) frequency band, a Sub 1 GHz (S1G) frequency band, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102 and/or at least one wireless communication device 140.

In some demonstrative embodiments, device 102 may include a mobile device or a non-mobile, e.g., a static, device.

For example, device 102 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, device 102 may include and/or perform the functionality of one or more STAs. For example, device 102 may include at least one STA.

In one example, a station (STA) may include a logical entity that is a singly addressable instance of a medium access control (MAC) and physical layer (PHY) interface to the wireless medium (WM). The STA may perform any other additional or alternative functionality.

In other embodiments, device 102 may operate as and/or perform one or more functionalities of any other wireless device and/or station, e.g., a WLAN STA, a WiFi STA, and the like.

In some demonstrative embodiments, device 140 may include an Access point (AP) STA.

In one example, an AP STA may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In other embodiments, device 102 may operate as, perform a role of, and/or perform one or more functionalities of, any other additional or alternative device and/or station.

In some demonstrative embodiments, wireless communication device 102 may be capable of communicating content, data, information and/or signals via a wireless medium (WM) 103, for example, with device 140. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, device 102 may include one or more radios including circuitry and/or logic to perform wireless communication between devices 102 and/or one or more other wireless communication devices. For example, device 102 may include at least one radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receivers 116 may include circuitry; logic;

Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 may include or may be implemented as part of a wireless Network Interface Card (NIC), and the like.

In some demonstrative embodiments, radio 114 may be configured to communicate over a 2.4 GHz band, a 5 GHz band, a directional band, for example, an mmWave band, a S1G band, a cellular band, an LTE band, and/or any other band.

In some demonstrative embodiments, radio 114 may include, or may be associated with, one or more antennas 107.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, Antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, Antennas 107 may include a phased array antenna, a multiple element antenna, a set of switched beam antennas, and/or the like. In some embodiments, Antennas 107 may implement transmit and receive functionalities using separate transmit and receive antenna elements. In some embodiments, Antennas 107 may implement transmit and receive functionalities using common and/or integrated transmit/receive elements.

In some demonstrative embodiments, device 102 may include a controller 124 configured to perform one or more communications, to generate and/or communicate one or more messages and/or transmissions, and/or to perform one or more functionalities, operations and/or procedures between device 102 and AP 140 and/or one or more other devices, e.g., as described below.

In some demonstrative embodiments, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In some demonstrative embodiments, at least part of the functionality of controller 124 may be implemented as part of one or more elements of radio 114. In other embodiments, the functionality of controller 124 may be implemented as part of any other element of device 102.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of radio 114. In some demonstrative embodiments, at least part of the functionality of message processor 128 may be implemented as part of controller 124. In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, device 102 may be configured to communicate over a plurality of channels ("multi channel operation"), for example, via a single RF chain, e.g., of radio 114.

In some demonstrative embodiments, device 102 may be configured to switch between channels of the plurality of channels according a Time Division Multiplexing (TDM) scheme.

In some demonstrative embodiments, device 102 may communicate with an AP, e.g., device 140, over a first wireless communication channel, for example, to communicate data between device 102 and the AP over an AP connection.

In some demonstrative embodiments, device 102 may switch from the first wireless communication channel to a second wireless communication channel, for example, to switch to communicate with another device, for example, a P2P device, e.g., a STA, an AP, or the like, over a P2P connection in the second wireless communication channel, e.g., to communicate data with the other device.

In some demonstrative embodiments, device 102 may be configured to utilize one or more power save mechanisms, for example, when switching from the first wireless communication channel to the second wireless communication channel, for example, in order to notify the AP that device 102 may be absent from the first wireless communication channel.

In some demonstrative embodiments, device 102 may be configured to send to the AP e.g., device 140, an indication of a power save mode of device 102, for example, prior to switching from the first wireless communication channel to the second wireless communication channel.

In some demonstrative embodiments, in some use, cases, scenarios and/or deployments, it may not be advantageous to allow device 102 to leave the first wireless communication channel, for example, immediately after sending the indication of the power save mode to the AP, as described below.

In one example, allowing device 102 to leave the first wireless communication channel, for example, immediately after sending the indication of the power save mode to AP 140, may result in significant decrease in throughput (TPT), e.g., to a very low TPT, for example, in an inbound traffic scenario. For example, although an AP, e.g., a "leaky AP", which may receive the frame indicating the power save mode, may acknowledge the frame, it may take some time until the AP actually process the power save mode. During this time, the AP may still continue to send frames to device 102, e.g., to clear queues of the AP. As a result, a communication rate with the AP, overall TPT and/or channel capacity may decrease.

In some demonstrative embodiments, device 102 may be configured to implement a waiting period (also referred to as "grace period"), for example, to wait on the first wireless communication channel, for example, even after notifying the AP that device 102 may be absent from the first wireless communication channel, e.g., as described below.

In some demonstrative embodiments, the waiting period may allow the AP to clear any queues of the AP for device 102, and to send one or more remaining frames to device 102, for example, before device 102 switches from the first wireless communication channel.

In some demonstrative embodiments, it may be not be advantageous to implement a static or constant waiting period, e.g., as described below.

In some demonstrative embodiments, a waiting period, which may result in device 102 leaving the first wireless communication channel too early, e.g., before the AP is able to properly process the power save notification and/or clear out queues for device 102, may result in reduced communication rates, overall TPT and/or channel capacity, and/or a performance of device 102 may be very low.

In some demonstrative embodiments, a waiting period, which may result in device 102 waiting too long on the first wireless communication channel, e.g., longer than the time required for the AP to properly process the power save notification and/or clear out queues for device 102, may result in reduced performance.

In one example, device 140 may include an AP ("well behaved AP") that is able to properly process the power save notification and/or to refrain from sending frames to a device right after receiving the power save notification from the device. According to this example, device 102 may lose airtime, for example, if device 102 is to wait a long time for buffered frames from the AP, e.g., which may not arrive. As a result, a number of channel switches of device 102 may be limited according to a required TPT, and a latency of a different channel solution may be confined, for example, according to the number of channel switches.

In some demonstrative embodiments, device 102 may be configured to adjust a duration of the waiting period, e.g., as described below.

In some demonstrative embodiments, device 102 may implement a learning algorithm, for example, to adapt the duration of the waiting period, for example, to enable interoperability with different APs from different vendors, and/or at different environment conditions, e.g., as described below.

In some demonstrative embodiments, the learning algorithm may be configured to adjust a duration of the waiting period, for example, based on statistics of one or more previous channel switches, e.g., as described below.

In some demonstrative embodiments, for example, device 102 may be configured to decrease the waiting period, e.g., even to zero, for example, when AP 140 is a "well behaved AP", e.g., an AP that buffers all frames for a device immediately after acknowledging a frame from device 102 with the power save bit enabled, e.g., as described below. According to this example, device 102 may not lose any air-time, for example, due to channel switches, and/or may be allowed to perform more channel switches, e.g., at a given period, which may allow lower latency with very low impact on channel capacity.

In some demonstrative embodiments, for example, device 102 may be configured to increase the waiting period, for example, when AP 140 is a "leaky AP", e.g., an AP that continues to send frames for device 102 even after acknowledging the frame with the power save bit enabled. For example, device 102 may be configured to extend the waiting period, e.g., to accommodate for a time required to receive the frames, for example, in a high Modulation and Coding Scheme (MCS), e.g., as described below. According to this example, device 102 may increase the duration of the waiting period, which may enable an overall TPT to remain high, e.g., since rates for inbound traffic from the leaky AP may be able to remain at a required level.

In some demonstrative embodiments, device 102 may be configured to adjust the duration of the waiting period, for example, which may be used by device 102, for waiting on first wireless communication channel, e.g., prior to switching to a second wireless communication channel, e.g., as described below.

In some demonstrative embodiments, controller 124 may be configured to control, cause and/or trigger device 102 to transmit a power save mode indication to an Access Point (AP), e.g., device 140, over a first wireless communication channel, e.g., as described below.

In some demonstrative embodiments, the power save mode indication may include a Non-Data Packet (NDP) having a Power Management (PM) bit to indicate a power save mode of device 102, e.g., as described below.

In other embodiments, the power save mode indication may include any other packet, message, and/or field, to indicate a power save mode.

In some demonstrative embodiments, controller 124 may be configured to control, cause and/or trigger device 102 to wait over the first wireless communication channel for a waiting period subsequent to transmission of the power save mode indication, e.g., as described below.

In some demonstrative embodiments, controller 124 may be configured to control, cause and/or trigger device 102 to switch to a second wireless communication channel after the waiting period, e.g., as described below.

In some demonstrative embodiments, controller 124 may be configured to control, cause and/or trigger device 102 to adjust a duration of the waiting period, for example, based on reception of one or more frames from the AP 140 during the waiting period, e.g., as described below.

In some demonstrative embodiments, controller 124 may be configured to control, cause and/or trigger device 102 to decrease the duration of the waiting period when no frame from the AP 140 is received during the waiting period.

In some demonstrative embodiments, controller 124 may be configured to control, cause and/or trigger device 102 to increase the duration of the waiting period when at least one frame is received from the AP 140 during the waiting time period, e.g., as described below.

In some demonstrative embodiments, controller 124 may be configured to control, cause and/or trigger device 102 to adjust the duration of the waiting period, for example, based on a criterion corresponding to a time of arrival of at least one frame from the AP 140 during the waiting period, e.g., as described below.

In some demonstrative embodiments, controller 124 may be configured to control, cause and/or trigger device 102 to adjust the duration of the waiting period, for example, based on whether at least one frame from the AP 140 is received during a time window beginning within the waiting period and ending at an end of the waiting period, e.g., as described below.

In some demonstrative embodiments, controller 124 may be configured to control, cause and/or trigger device 102 to increase the duration of the waiting period for example, when the at least one frame from the AP 140 is received during the time window, e.g., as described below.

In one example, the time window may begin 1 millisecond (ms) before the end of the waiting period and may end at the end of the waiting period. According to this example, device 102 may increase the duration of the waiting period, for example, when at least one frame from device 140 is received less than 1 ms before the end of the waiting period.

In some demonstrative embodiments, controller 124 may be configured to control, cause and/or trigger device 102 to decrease the duration of the waiting period for example, when no frame from the AP is received during the time window, e.g., as described below.

In one example, the time window may begin 2 ms before the end of the waiting period and may end at the end of the waiting period. According to this example, device 102 may decrease the duration of the waiting period for example, when no frame from device 140 is received within 2 ms before the end of the waiting period.

In other embodiments, the time window may have any other duration.

In some demonstrative embodiments, controller 124 may be configured to control, cause and/or trigger device 102 to increase the duration of the waiting period for example, when at least one frame from the AP is received during a first time window, controller 124 may be configured to control, cause and/or trigger device 102 to decrease the duration of the waiting period for example, when no frame is received from the AP during a second time window, e.g., as described below.

In some demonstrative embodiments, the first time window may begin at a first time within the waiting period and may end at an end of the waiting period, e.g., as described below.

In some demonstrative embodiments, the second time window may begin at a second time within the waiting window and may end at the end of the waiting period, e.g., as described below.

In some demonstrative embodiments, the second time may be before the first time, e.g., as described below.

In some demonstrative embodiments, controller 124 may be configured to control, cause and/or trigger device 102 to maintain the duration of the waiting period, for example, when a last frame from the AP is received in a third time window between the first time and the second time, e.g., as described below.

In one example, the first time window may be between 1 ms before the end of the waiting period and the end of the waiting period, the second time window may be between 2 ms before the end of the waiting period and the end of the waiting period, and/or the third time window may be between 2 ms before the end of the waiting period and 1 ms before the end of the waiting period. According to this example, device 102 may increase the duration of the waiting period, e.g., if device 102 receives from device 140 a frame during the last 1 ms of the waiting period; device 102 may decrease the duration of the waiting period, e.g., if device 102 does not receive from device 140 any frame during the last 2 ms of the waiting window; and/or device 102 may maintain the duration of the waiting period, e.g., if device 102 receives a last frame from device 140 in the period between 2 ms and 1 ms before the end of the waiting period.

In another example, the first second and third time windows may include any other time windows within the waiting period.

In other embodiments, any other additional or alternative number and/or arrangement of time windows with any other duration and/or timing may be implemented.

In some demonstrative embodiments, in one implementation, for example, device 102 may communicate with a "leaky" AP 140, for example, while operating at a dual channel mode, e.g., to communicate with AP 140 over a first channel, and to switch to a second channel to communicate with another device. In one example, implementing the grace period mechanism, e.g., as described above, may enable device 102 to maintain a desired level of TPT, for example, as device 102 may be able to properly acknowledge some or even all frames from the leaky AP, e.g., even after sending the power save message to the "leaky" AP.

In some demonstrative embodiments, in one implementation, for example, device 102 may communicate with a "well behaved" AP 140, for example, while operating at a dual channel mode, e.g., to communicate with AP 140 over a first channel, and to switch to a second channel to communicate with another device. In one example, implementing the grace period mechanism, e.g., as described above, may enable device 102 to maintain a high level of TPT over both channels, for example, with a reduced, e.g., minimal, time difference, for example, due to adjusting the grace period to a reduced or even minimal duration.

Figure 2:
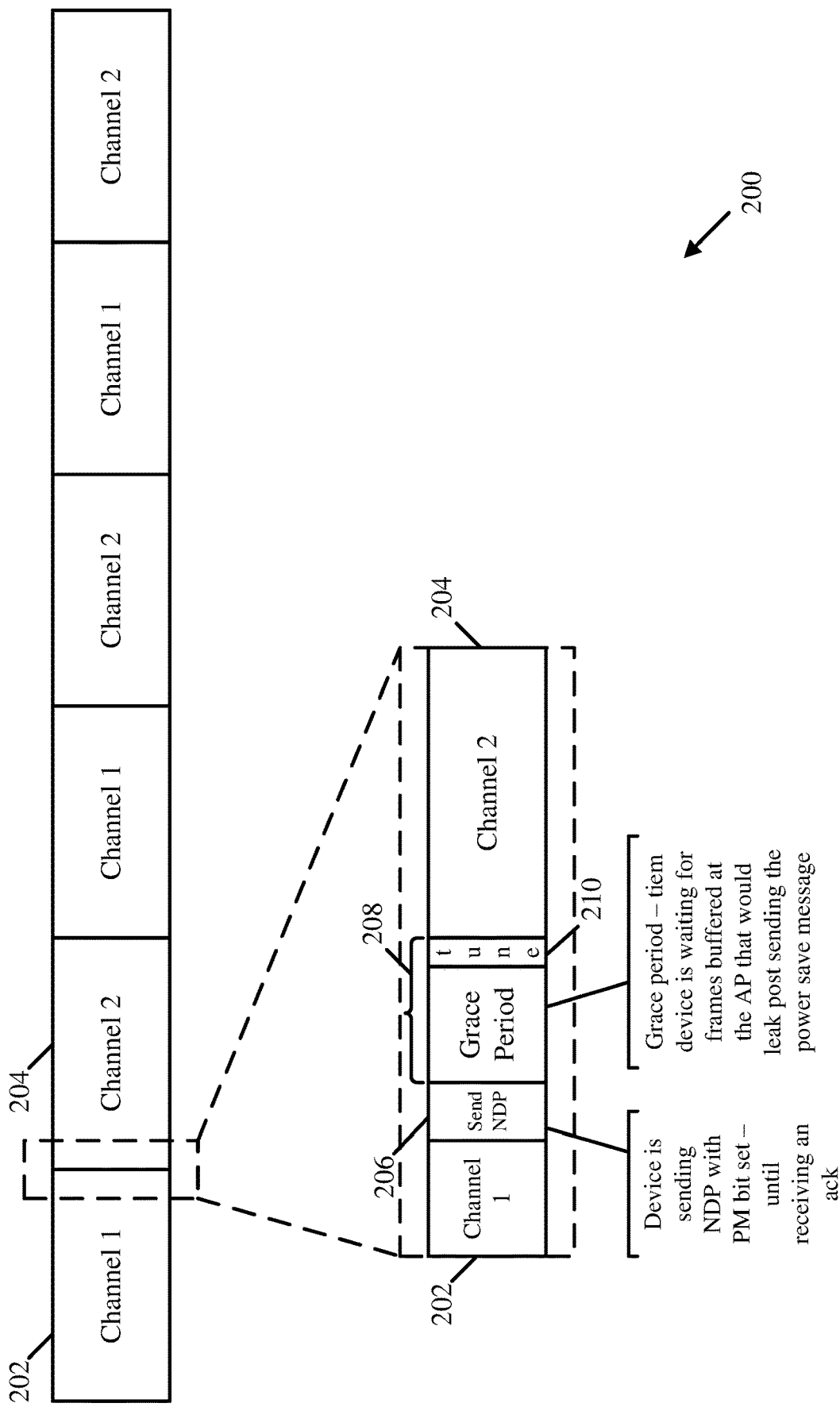
FIG. 2 is a schematic illustration of a channel-switching scheme, in accordance with some demonstrative embodiments.

Reference is made to FIG. 2, which schematically illustrates a channel-switching scheme 200, in accordance with some demonstrative embodiments. In one example, device 102 (FIG. 1) may be configured to perform one or more operations and/or communications in accordance with channel-switching scheme 200, e.g., as described below.

In some demonstrative embodiments, as shown in FIG. 2, a STA, e.g., device 102 (FIG. 1), may switch between a first wireless communication channel, denoted Channel 1, and a second wireless communication channel, denoted Channel 2. For example, as shown in FIG. 2, the STA may communicate over the first wireless communication channel during a period 202, and may switch to communicate over the second wireless communication channel during a time period 204.

In some demonstrative embodiments, as shown in FIG. 2, during a time period 206, while operating on the first wireless communication channel, the STA may send to an AP, e.g., device 140 (FIG. 1), a transmission of an NDP with the PM bit set to one, e.g., to indicate to the AP a power save mode of the STA. As shown in FIG. 2, the period 206 may end, for example, when the STA receives an acknowledge (ack) frame from the AP.

In some demonstrative embodiments, as shown in FIG. 2, the STA may be configured to remain on the first wireless communication channel for a waiting period 208 ("grace period"), e.g., between the reception of the ack frame from the AP, and a time to before starting a tuning procedure (210) to switch to the second wireless communication channel.

In some demonstrative embodiments, during waiting period 208 the STA may wait on the first wireless communication channel, for example, to receive frames buffered at the AP.

In some demonstrative embodiments, waiting period 208 may include a time window configured to enable the STA to receive one or more buffered frames from the AP, for example, after the transmission of the NDP.

In some demonstrative embodiments, waiting period 208 may enable the buffered frames to be received by the STA. For example, the buffered frames may "leak", for example, if device 102 is to switch to the second wireless communication channel, e.g., immediately after sending the NDP to the AP, while the AP may transmit the buffered frames over first wireless communication channel even after acknowledging the NDP.

In some demonstrative embodiments, the STA, e.g., device 102 (FIG. 1) may be configured to dynamically adjust a duration of waiting period 208, for example, based on whether or not frames are actually received from the AP during one or more time windows in the waiting period 208, e.g., as described below.

In one example, although the AP is not supposed to transmit any frame after reception of the NDP, many AP implementations, e.g., low-cost implementations, de-facto transmit frames after the reception of the NDP. Adjusting the waiting period 208 may enable the STA to adapt its waiting period to a behavior of the AP.

Figure 3:
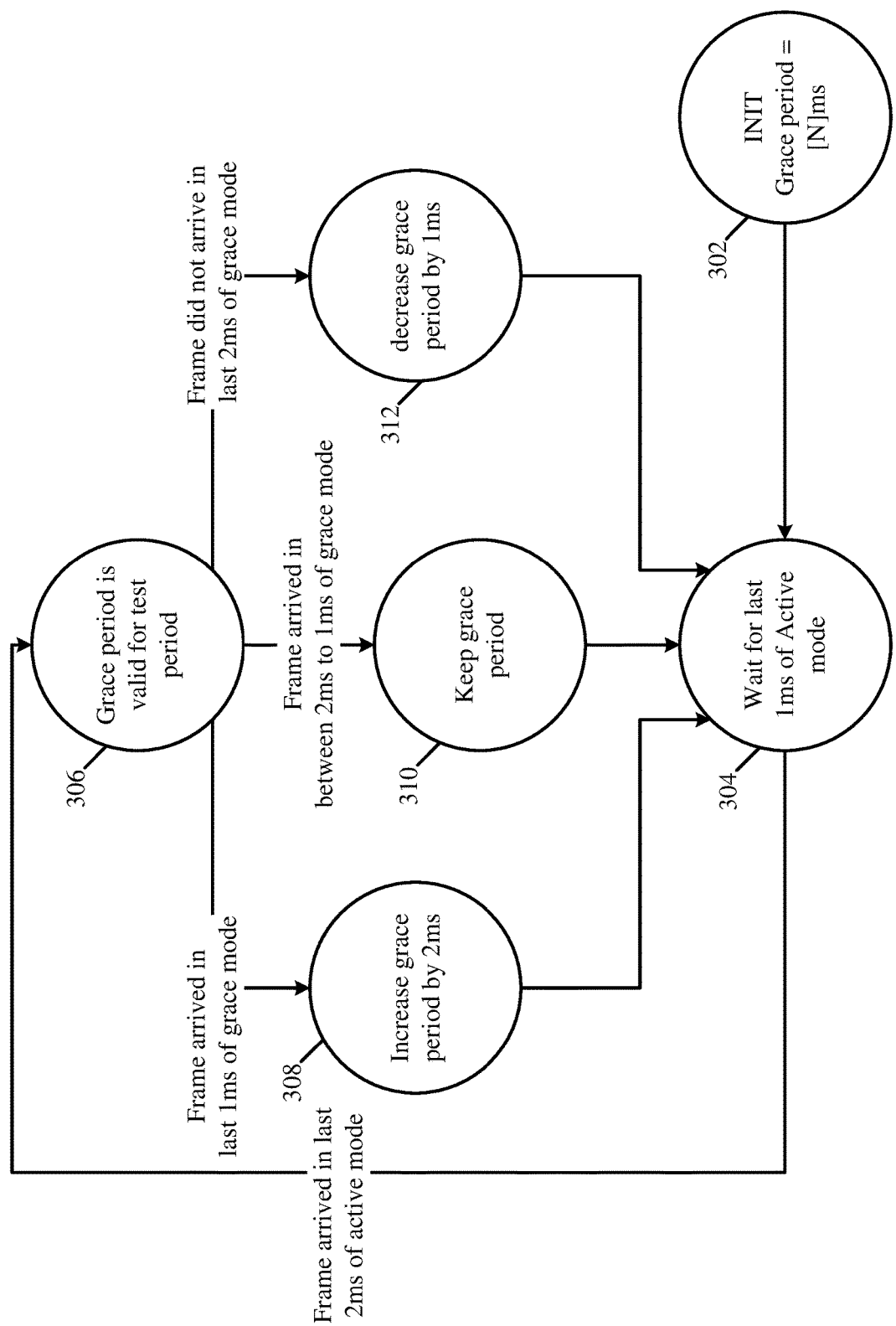
FIG. 3 is a schematic flow-chart illustration of a method of adjusting a duration of a waiting period, in accordance with some demonstrative embodiments.

Reference is made to FIG. 3, which schematically illustrates a method of adjusting the duration of a waiting period, in accordance with some demonstrative embodiments. For example, one or more of the operations of the method of FIG. 3 may be performed by one or more elements of a system, e.g., system 100 (FIG. 1), for example, one or more wireless devices, e.g., device 102 (FIG. 1); a controller, e.g., controller 124 (FIG. 1); and/or a message processor, e.g., message processor 128 (FIG. 1), for example, to dynamically adjust a waiting period, e.g., grace period 208 (FIG. 2), based on receipt of frames from an AP, e.g., device 140 (FIG. 1), for example, after sending the power save notification to the AP.

As indicated at block 302, the method may include setting by a wireless device an initial duration of a waiting period ("grace period"), which may be dynamically adjusted.

As indicated at block 304, the method may include waiting until a predefined time, e.g., the last 1 ms, before the end of the waiting period.

As indicated at block 306, the method may include monitoring a time of arrival of one or more frames from the AP and adjusting the grace period based on the time of arrival, e.g., as described below.

As indicated at block 308, the method may include increasing the grace period by a first duration, e.g., 2 ms, for example, if a frame from the AP arrives at the wireless device during a first time window within the grace period, e.g., the last 1 ms of the grace period.

As indicated at block 310, the method may include maintaining the duration of the grace period, for example, if a last frame from the AP arrives at the wireless device during a second time window within the grace period, e.g., between the last 1 ms and the last 2 ms of the grace period.

As indicated at block 312, the method may include decreasing the grace period by a second duration, e.g., 1 ms, for example, if no frame from the AP arrives at the wireless device during a third time window within the grace period, e.g., the last 2 ms of the grace period.

In other embodiments, any other number of time windows, and/or any other time window duration and/or arrangement may be used.

Figure 4:
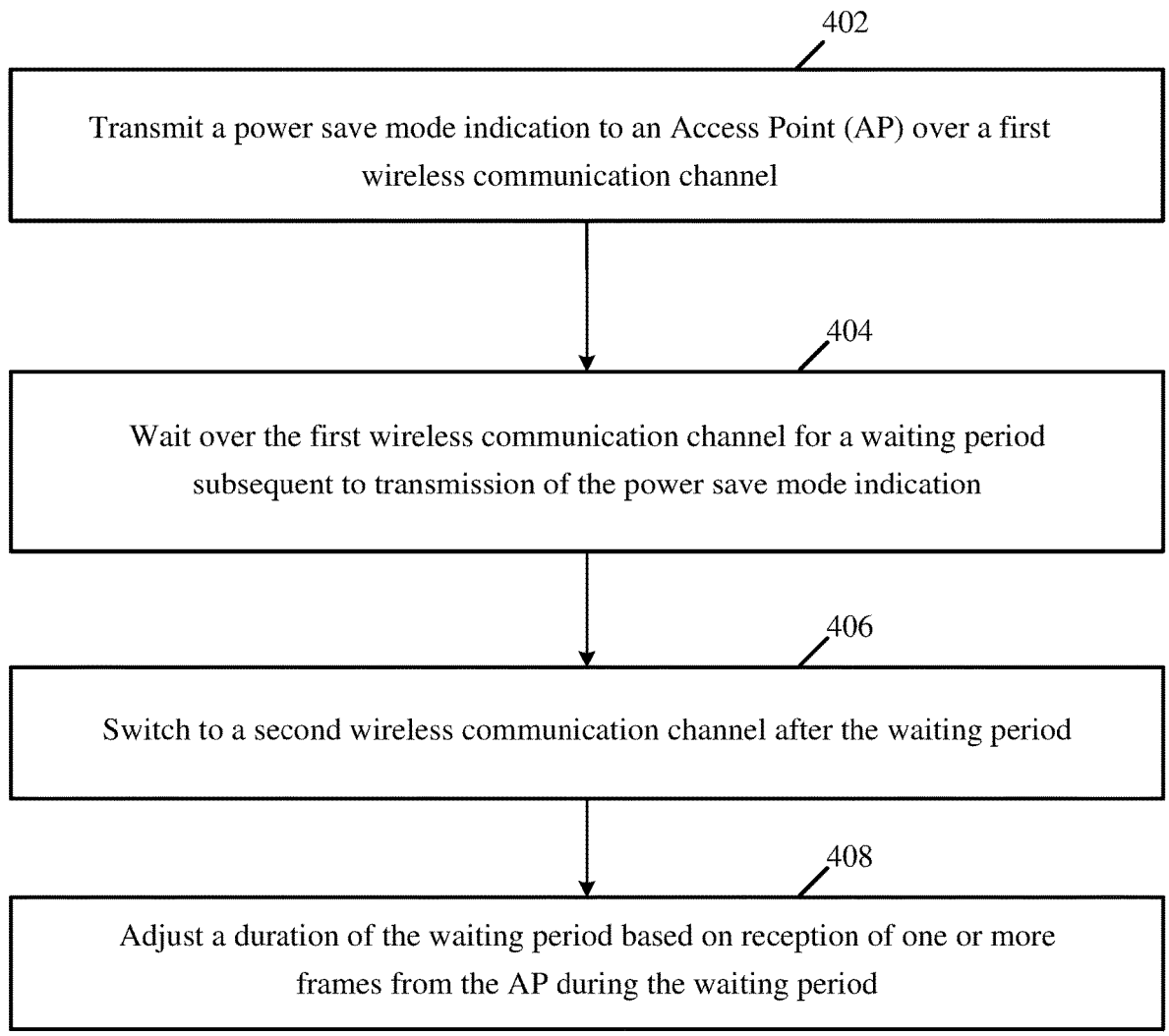
FIG. 4 is a schematic flow-chart illustration of a method of channel switching, in accordance with some demonstrative embodiments.

Reference is made to FIG. 4, which schematically illustrates a method of channel switching, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1); a controller, e.g., controller 124 (FIG. 1); and/or a message processor, e.g., message processor 128 (FIG. 1).

As indicated at block 402, the method may include transmitting a power save mode indication to an AP over a first wireless communication channel. For example, controller 124 (FIG. 1) may control cause and/or trigger device 102 (FIG. 1) to transmit the power save mode indication to device 140 (FIG. 1) over the first wireless communication channel, e.g., as described above.

As indicated at block 404, the method may include waiting over the first wireless communication channel for a waiting period subsequent to transmission of the power save mode indication. For example, controller 124 (FIG. 1) may control cause and/or trigger device 102 (FIG. 1) to wait over the first wireless communication channel for the waiting period subsequent to the transmission of the power save mode indication, e.g., as described above.

As indicated at block 406, the method may include switching to a second wireless communication channel after the waiting period. For example, controller 124 (FIG. 1) may control cause and/or trigger device 102 (FIG. 1) to allow device 102 (FIG. 1) to switch to the second wireless communication channel after the waiting period, e.g., as described above.

As indicated at block 408, the method may include adjusting a duration of the waiting period based on reception of one or more frames from the AP during the waiting period. For example, controller 124 (FIG. 1) may control cause and/or trigger device 102 (FIG. 1) to adjust the duration of the waiting period based on the reception of the one or more frames from device 140 (FIG. 1) during the waiting period, e.g., as described above.

Figure 5:
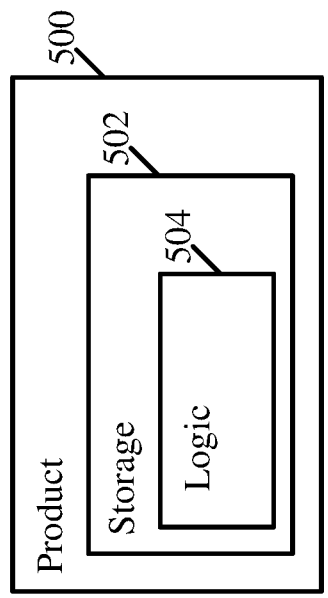
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include one or more tangible computer-readable non-transitory storage media 502, which may include computer-executable instructions, e.g., implemented by logic 504, operable to, when executed by at least one computer processor, enable the at least one computer processor to implement one or more operations at device 102 (FIG. 1), controller 124 (FIG. 1), radio 114 (FIG. 1), and/or message processor 128 (FIG. 1), to cause device 102 (FIG. 1), controller 124 (FIG. 1), radio 114 (FIG. 1), and/or message processor 128 (FIG. 1) to perform one or more operations, and/or to perform, trigger and/or implement one or more operations, communications and/or functionalities described above with reference to FIGS. 1, 2, 3, and/or 4, and/or one or more operations described herein. The phrase "non-transitory machine-readable medium" is directed to include all computer-readable media, with the sole exception being a transitory propagating signal.

In some demonstrative embodiments, product 500 and/or storage media 502 may include one or more types of computer-readable storage media capable of storing data, including volatile memory, non-volatile memory, removable or non-removable memory, erasable or non-erasable memory, writeable or re-writeable memory, and the like. For example, storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless communication station to transmit a power save mode indication to an Access Point (AP) over a first wireless communication channel; wait over the first wireless communication channel for a waiting period subsequent to transmission of the power save mode indication; switch to a second wireless communication channel after the waiting period; and adjust a duration of the waiting period based on reception of one or more frames from the AP during the waiting period.

Example 2 includes the subject matter of Example 1, and optionally, wherein the apparatus is configured to cause the wireless communication station to adjust the duration of the waiting period based on a criterion corresponding to a time of arrival of at least one frame from the AP during the waiting period.

Example 3 includes the subject matter of Example 1 or 2, and optionally, wherein the apparatus is configured to cause the wireless communication station to adjust the duration of the waiting period based on whether at least one frame from the AP is received during a time window beginning within the waiting period and ending at an end of the waiting period.

Example 4 includes the subject matter of Example 3, and optionally, wherein the apparatus is configured to cause the wireless communication station to decrease the duration of the waiting period when no frame from the AP is received during the time window.

Example 5 includes the subject matter of Example 3, and optionally, wherein the apparatus is configured to cause the wireless communication station to increase the duration of the waiting period when the at least one frame from the AP is received during the time window.

Example 6 includes the subject matter of Example 1 or 2, and optionally, wherein the apparatus is configured to cause the wireless communication station to increase the duration of the waiting period when at least one frame from the AP is received during a first time window, and to decrease the duration of the waiting period when no frame is received from the AP during a second time window, the first time window is to begin at a first time within the waiting period and to end at an end of the waiting period, and the second time window is to begin at a second time within the waiting window and to end at the end of the waiting period.

Example 7 includes the subject matter of Example 6, and optionally, wherein the apparatus is configured to cause the wireless communication station to maintain the duration of the waiting period when a last frame from the AP is received in a third time window between the first time and the second time.

Example 8 includes the subject matter of Example 6 or 7, and optionally, wherein the second time is before the first time.

Example 9 includes the subject matter of Example 1, and optionally, wherein the apparatus is configured to cause the wireless communication station to increase the duration of the waiting period when at least one frame is received from the AP during the waiting period.

Example 10 includes the subject matter of Example 1, and optionally, wherein the apparatus is configured to cause the wireless communication station to decrease the duration of the waiting period when no frame is received from the AP during the waiting period.

Example 11 includes the subject matter of any one of Examples 1-10, and optionally, wherein the indication comprises a Non-Data Packet (NDP) having a Power Management (PM) bit to indicate a power save mode of the wireless communication station.

Example 12 includes the subject matter of any one of Examples 1-11, and optionally, comprising a radio to transmit the indication.

Example 13 includes the subject matter of any one of Examples 1-12, and optionally, comprising one or more antennas, a processor, and a memory.

Example 14 includes a system of wireless communication comprising a wireless communication station, the wireless communication station comprising one or more antennas; a radio; a memory; a processor; and a controller configured to cause the wireless communication station to transmit a power save mode indication to an Access Point (AP) over a first wireless communication channel; wait over the first wireless communication channel for a waiting period subsequent to transmission of the power save mode indication; switch to a second wireless communication channel after the waiting period; and adjust a duration of the waiting period based on reception of one or more frames from the AP during the waiting period.

Example 15 includes the subject matter of Example 14, and optionally, wherein the controller is configured to cause the wireless communication station to adjust the duration of the waiting period based on a criterion corresponding to a time of arrival of at least one frame from the AP during the waiting period.

Example 16 includes the subject matter of Example 14 or 15, and optionally, wherein the controller is configured to cause the wireless communication station to adjust the duration of the waiting period based on whether at least one frame from the AP is received during a time window beginning within the waiting period and ending at an end of the waiting period.

Example 17 includes the subject matter of Example 16, and optionally, wherein the controller is configured to cause the wireless communication station to decrease the duration of the waiting period when no frame from the AP is received during the time window.

Example 18 includes the subject matter of Example 16, and optionally, wherein the controller is configured to cause the wireless communication station to increase the duration of the waiting period when the at least one frame from the AP is received during the time window.

Example 19 includes the subject matter of Example 14 or 15, and optionally, wherein the controller is configured to cause the wireless communication station to increase the duration of the waiting period when at least one frame from the AP is received during a first time window, and to decrease the duration of the waiting period when no frame is received from the AP during a second time window, the first time window is to begin at a first time within the waiting period and to end at an end of the waiting period, and the second time window is to begin at a second time within the waiting window and to end at the end of the waiting period.

Example 20 includes the subject matter of Example 19, and optionally, wherein the controller is configured to cause the wireless communication station to maintain the duration of the waiting period when a last frame from the AP is received in a third time window between the first time and the second time.

Example 21 includes the subject matter of Example 19 or 20, and optionally, wherein the second time is before the first time.

Example 22 includes the subject matter of Example 14, and optionally, wherein the controller is configured to cause the wireless communication station to increase the duration of the waiting period when at least one frame is received from the AP during the waiting period.

Example 23 includes the subject matter of Example 14, and optionally, wherein the controller is configured to cause the wireless communication station to decrease the duration of the waiting period when no frame is received from the AP during the waiting period.

Example 24 includes the subject matter of any one of Examples 14-23, and optionally, wherein the indication comprises a Non-Data Packet (NDP) having a Power Management (PM) bit to indicate a power save mode of the wireless communication station.

Example 25 includes the subject matter of any one of Examples 14-24, and optionally, wherein the radio is to transmit the indication.

Example 26 includes a method to be performed at a wireless communication station, the method comprising transmitting a power save mode indication to an Access Point (AP) over a first wireless communication channel; waiting over the first wireless communication channel for a waiting period subsequent to transmission of the power save mode indication; switching to a second wireless communication channel after the waiting period; and adjusting a duration of the waiting period based on reception of one or more frames from the AP during the waiting period.

Example 27 includes the subject matter of Example 26, and optionally, comprising adjusting the duration of the waiting period based on a criterion corresponding to a time of arrival of at least one frame from the AP during the waiting period.

Example 28 includes the subject matter of Example 26 or 27, and optionally, comprising adjusting the duration of the waiting period based on whether at least one frame from the AP is received during a time window beginning within the waiting period and ending at an end of the waiting period.

Example 29 includes the subject matter of Example 28, and optionally, comprising decreasing the duration of the waiting period when no frame from the AP is received during the time window.

Example 30 includes the subject matter of Example 28, and optionally, comprising increasing the duration of the waiting period when the at least one frame from the AP is received during the time window.

Example 31 includes the subject matter of Example 26 or 27, and optionally, comprising increasing the duration of the waiting period when at least one frame from the AP is received during a first time window, and decreasing the duration of the waiting period when no frame is received from the AP during a second time window, the first time window is to begin at a first time within the waiting period and to end at an end of the waiting period, and the second time window is to begin at a second time within the waiting window and to end at the end of the waiting period.

Example 32 includes the subject matter of Example 31, and optionally, comprising maintaining the duration of the waiting period when a last frame from the AP is received in a third time window between the first time and the second time.

Example 33 includes the subject matter of Example 31 or 32, and optionally, wherein the second time is before the first time.

Example 34 includes the subject matter of Example 26, and optionally, comprising increasing the duration of the waiting period when at least one frame is received from the AP during the waiting period.

Example 35 includes the subject matter of Example 26, and optionally, comprising decreasing the duration of the waiting period when no frame is received from the AP during the waiting period.

Example 36 includes the subject matter of any one of Examples 26-35, and optionally, wherein the indication comprises a Non-Data Packet (NDP) having a Power Management (PM) bit to indicate a power save mode of the wireless communication station.

Example 37 includes a product including one or more tangible computer-readable non-transitory storage media comprising computer-executable instructions operable to, when executed by at least one processor, enable the at least one processor to cause a wireless communication station to transmit a power save mode indication to an Access Point (AP) over a first wireless communication channel; wait over the first wireless communication channel for a waiting period subsequent to transmission of the power save mode indication; switch to a second wireless communication channel after the waiting period; and adjust a duration of the waiting period based on reception of one or more frames from the AP during the waiting period.

Example 38 includes the subject matter of Example 37, and optionally, wherein the instructions, when executed, cause the wireless communication station to adjust the duration of the waiting period based on a criterion corresponding to a time of arrival of at least one frame from the AP during the waiting period.

Example 39 includes the subject matter of Example 37 or 38, and optionally, wherein the instructions, when executed, cause the wireless communication station to adjust the duration of the waiting period based on whether at least one frame from the AP is received during a time window beginning within the waiting period and ending at an end of the waiting period.

Example 40 includes the subject matter of Example 39, and optionally, wherein the instructions, when executed, cause the wireless communication station to decrease the duration of the waiting period when no frame from the AP is received during the time window.

Example 41 includes the subject matter of Example 39, and optionally, wherein the instructions, when executed, cause the wireless communication station to increase the duration of the waiting period when the at least one frame from the AP is received during the time window.

Example 42 includes the subject matter of Example 37 or 38, and optionally, wherein the instructions, when executed, cause the wireless communication station to increase the duration of the waiting period when at least one frame from the AP is received during a first time window, and to decrease the duration of the waiting period when no frame is received from the AP during a second time window, the first time window is to begin at a first time within the waiting period and to end at an end of the waiting period, and the second time window is to begin at a second time within the waiting window and to end at the end of the waiting period.

Example 43 includes the subject matter of Example 42, and optionally, wherein the instructions, when executed, cause the wireless communication station to maintain the duration of the waiting period when a last frame from the AP is received in a third time window between the first time and the second time.

Example 44 includes the subject matter of Example 42 or 43, and optionally, wherein the second time is before the first time.

Example 45 includes the subject matter of Example 37, and optionally, wherein the instructions, when executed, cause the wireless communication station to increase the duration of the waiting period when at least one frame is received from the AP during the waiting period.

Example 46 includes the subject matter of Example 37, and optionally, wherein the instructions, when executed, cause the wireless communication station to decrease the duration of the waiting period when no frame is received from the AP during the waiting period.

Example 47 includes the subject matter of any one of Examples 37-46, and optionally, wherein the indication comprises a Non-Data Packet (NDP) having a Power Management (PM) bit to indicate a power save mode of the wireless communication station.

Example 48 includes an apparatus of wireless communication by a wireless communication station, the apparatus comprising means for transmitting a power save mode indication to an Access Point (AP) over a first wireless communication channel; means for waiting over the first wireless communication channel for a waiting period subsequent to transmission of the power save mode indication; means for switching to a second wireless communication channel after the waiting period; and means for adjusting a duration of the waiting period based on reception of one or more frames from the AP during the waiting period.

Example 49 includes the subject matter of Example 48, and optionally, comprising means for adjusting the duration of the waiting period based on a criterion corresponding to a time of arrival of at least one frame from the AP during the waiting period.

Example 50 includes the subject matter of Example 48 or 49, and optionally, comprising means for adjusting the duration of the waiting period based on whether at least one frame from the AP is received during a time window beginning within the waiting period and ending at an end of the waiting period.

Example 51 includes the subject matter of Example 50, and optionally, comprising means for decreasing the duration of the waiting period when no frame from the AP is received during the time window.

Example 52 includes the subject matter of Example 50, and optionally, comprising means for increasing the duration of the waiting period when the at least one frame from the AP is received during the time window.

Example 53 includes the subject matter of Example 48 or 49, and optionally, comprising means for increasing the duration of the waiting period when at least one frame from the AP is received during a first time window, and decreasing the duration of the waiting period when no frame is received from the AP during a second time window, the first time window is to begin at a first time within the waiting period and to end at an end of the waiting period, and the second time window is to begin at a second time within the waiting window and to end at the end of the waiting period.

Example 54 includes the subject matter of Example 53, and optionally, comprising means for maintaining the duration of the waiting period when a last frame from the AP is received in a third time window between the first time and the second time.

Example 55 includes the subject matter of Example 53 or 54, and optionally, wherein the second time is before the first time.

Example 56 includes the subject matter of Example 48, and optionally, comprising means for increasing the duration of the waiting period when at least one frame is received from the AP during the waiting period.

Example 57 includes the subject matter of Example 48, and optionally, comprising means for decreasing the duration of the waiting period when no frame is received from the AP during the waiting period.

Example 58 includes the subject matter of any one of Examples 48-57, and optionally, wherein the indication comprises a Non-Data Packet (NDP) having a Power Management (PM) bit to indicate a power save mode of the wireless communication station.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication station to:
   transmit a power save mode indication to an Access Point (AP) over a first wireless communication channel;
   wait over the first wireless communication channel for a waiting period subsequent to transmission of the power save mode indication;
   switch to a second wireless communication channel after the waiting period; and
   adjust a duration of the waiting period based on reception of one or more frames from the AP during the waiting period, wherein the apparatus is configured to cause the wireless communication station to increase the duration of the waiting period when at least one frame is received from the AP during the waiting period, and wherein the apparatus is configured to cause the wireless communication station to decrease the duration of the waiting period when no frame is received from the AP during the waiting period.

2. The apparatus of claim 1 configured to cause the wireless communication station to adjust the duration of the waiting period based on a criterion corresponding to a time of arrival of the at least one frame from the AP during the waiting period.

3. The apparatus of claim 1 configured to cause the wireless communication station to adjust the duration of the waiting period based on whether the at least one frame from the AP is received during a time window beginning within the waiting period and ending at an end of the waiting period.

4. The apparatus of claim 3 configured to cause the wireless communication station to decrease the duration of the waiting period when no frame from the AP is received during the time window.

5. The apparatus of claim 3 configured to cause the wireless communication station to increase the duration of the waiting period when the at least one frame from the AP is received during the time window.

6. The apparatus of claim 1 configured to cause the wireless communication station to increase the duration of the waiting period when the at least one frame from the AP is received during a first time window, and to decrease the duration of the waiting period when no frame is received from the AP during a second time window, the first time window is to begin at a first time within the waiting period and to end at an end of the waiting period, and the second time window is to begin at a second time within the waiting window and to end at the end of the waiting period.

7. The apparatus of claim 6 configured to cause the wireless communication station to maintain the duration of the waiting period when a last frame from the AP is received in a third time window between the first time and the second time.

8. The apparatus of claim 6, wherein the second time is before the first time.

9. The apparatus of claim 1, wherein the power save mode indication comprises a Non-Data Packet (NDP) having a Power Management (PM) bit to indicate a power save mode of the wireless communication station.

10. The apparatus of claim 1 comprising a radio to transmit the power save mode indication.

11. The apparatus of claim 1 comprising one or more antennas, a processor, and a memory.

12. A system of wireless communication comprising a wireless communication station, the wireless communication station comprising:
   one or more antennas;
   a radio;
   a memory;
   a processor; and
   a controller configured to cause the wireless communication station to:
      transmit a power save mode indication to an Access Point (AP) over a first wireless communication channel;
      wait over the first wireless communication channel for a waiting period subsequent to transmission of the power save mode indication;
      switch to a second wireless communication channel after the waiting period; and
      adjust a duration of the waiting period based on reception of one or more frames from the AP during the waiting period, wherein the controller is configured to cause the wireless communication station to increase the duration of the waiting period when at least one frame is received from the AP during the waiting period, and wherein the controller is configured to cause the wireless communication station to decrease the duration of the waiting period when no frame is received from the AP during the waiting period.

13. The system of claim 12, wherein the controller is configured to cause the wireless communication station to adjust the duration of the waiting period based on a criterion corresponding to a time of arrival of the at least one frame from the AP during the waiting period.

14. The system of claim 12, wherein the controller is configured to cause the wireless communication station to adjust the duration of the waiting period based on whether the at least one frame from the AP is received during a time window beginning within the waiting period and ending at an end of the waiting period.

15. The system of claim 12, wherein the controller is configured to cause the wireless communication station to increase the duration of the waiting period when the at least one frame from the AP is received during a first time window, and to decrease the duration of the waiting period when no frame is received from the AP during a second time window, the first time window is to begin at a first time within the waiting period and to end at an end of the waiting period, and the second time window is to begin at a second time within the waiting window and to end at the end of the waiting period.

16. The system of claim 12, wherein the power save mode indication comprises a Non-Data Packet (NDP) having a Power Management (PM) bit to indicate a power save mode of the wireless communication station.

17. A method to be performed at a wireless communication station, the method comprising:
    transmitting a power save mode indication to an Access Point (AP) over a first wireless communication channel;
    waiting over the first wireless communication channel for a waiting period subsequent to transmission of the power save mode indication;
    switching to a second wireless communication channel after the waiting period; and
    adjusting a duration of the waiting period based on reception of one or more frames from the AP during the waiting period, wherein adjusting the duration of the waiting period comprises increasing the duration of the waiting period when at least one frame is received from the AP during the waiting period, and decreasing the duration of the waiting period when no frame is received from the AP during the waiting period.

18. The method of claim 17 comprising adjusting the duration of the waiting period based on a criterion corresponding to a time of arrival of the at least one frame from the AP during the waiting period.

19. The method of claim 17, wherein the power save mode indication comprises a Non-Data Packet (NDP) having a Power Management (PM) bit to indicate a power save mode of the wireless communication station.

20. A product including one or more tangible computer-readable non-transitory storage media comprising computer-executable instructions operable to, when executed by at least one processor, enable the at least one processor to cause a wireless communication station to:
    transmit a power save mode indication to an Access Point (AP) over a first wireless communication channel;
    wait over the first wireless communication channel for a waiting period subsequent to transmission of the power save mode indication;
    switch to a second wireless communication channel after the waiting period; and
    adjust a duration of the waiting period based on reception of one or more frames from the AP during the waiting period, wherein the instructions, when executed, cause the wireless communication station to increase the duration of the waiting period when at least one frame is received from the AP during the waiting period, and to decrease the duration of the waiting period when no frame is received from the AP during the waiting period.

21. The product of claim 20, wherein the instructions, when executed, cause the wireless communication station to adjust the duration of the waiting period based on a criterion corresponding to a time of arrival of the at least one frame from the AP during the waiting period.

22. The product of claim 20, wherein the instructions, when executed, cause the wireless communication station to adjust the duration of the waiting period based on whether the at least one frame from the AP is received during a time window beginning within the waiting period and ending at an end of the waiting period.

23. The product of claim 20, wherein the power save mode indication comprises a Non-Data Packet (NDP) having a Power Management (PM) bit to indicate a power save mode of the wireless communication station.

* * * * *